US012563378B2

(12) United States Patent
Liang et al.

(10) Patent No.:     US 12,563,378 B2
(45) Date of Patent:        Feb. 24, 2026

(54) ENHANCED 911 ADDRESS CHECK BYPASS

(71) Applicant: T-Mobile Innovations LLC, Overland Park, KS (US)

(72) Inventors: Patrick Liang, Auburn, WA (US); Anthony Yiu, Newcastle, WA (US); Teresa Burnam Treiber, Springfield, VA (US)

(73) Assignee: T-Mobile Innovations LLC

( * ) Notice: Subject to any disclaimer, the term of this patent is extended or adjusted under 35 U.S.C. 154(b) by 332 days.

(21) Appl. No.: 18/487,390

(22) Filed: Oct. 16, 2023

(65) Prior Publication Data

US 2025/0126450 A1     Apr. 17, 2025

(51) Int. Cl.
    *H04W 4/90*          (2018.01)
(52) U.S. Cl.
    CPC ..................................... *H04W 4/90* (2018.02)
(58) Field of Classification Search
    CPC .... H04M 3/323; H04M 3/5116; H04W 76/50; H04W 4/14; G01S 19/17; G08B 25/016; G06F 8/51
    See application file for complete search history.

(56) References Cited

U.S. PATENT DOCUMENTS

| | | | |
|---|---|---|---|
| 2007/0189467 A1 | 8/2007 | Croak et al. | |
| 2008/0081646 A1 | 4/2008 | Morin et al. | |
| 2009/0086932 A1* | 4/2009 | Ray .......................... | H04W 4/90 |
| | | | 379/45 |
| 2014/0215446 A1* | 7/2014 | Araya ...................... | G06F 8/456 |
| | | | 717/137 |
| 2016/0366574 A1* | 12/2016 | Dahan ...................... | H04W 4/90 |
| 2019/0132903 A1* | 5/2019 | Suxena .................... | H04W 4/14 |

* cited by examiner

*Primary Examiner* — Maria El-Zoobi
(74) *Attorney, Agent, or Firm* — Jones Burke, PLLC

(57)          ABSTRACT

Systems, methods and non-transitory computer-readable mediums are provided for an entitlement system and method having an E911 address check bypass function. Methods provided herein include receiving a request from a mobile device for enabling voice over WiFi (VoWiFi) service and checking E911 address status. Methods further include applying a filter to the request to determine that the E911 address check can be bypassed and transmitting a response to the mobile device indicating that E911 address status is not required and that VoWiFi connection is permitted, thereby bypassing the E911 address check.

20 Claims, 6 Drawing Sheets

400

RECEIVE REQUEST FROM MOBILE DEVICE
FOR VOWIFI
410

APPLY FILTER TO REQUEST
420

DETERMINE THAT ADDRESS CHECK CAN
BE BYPASSED BASED ON FILTER
430

TRANSMIT RESPONSE ALLOWING VOWIFI
WITHOUT ADDRESS CHECK
440

500

RECEIVE REQUESTFROM MOBILE
DEVICE FOR VOWIFI
510

APPLY FILTER AND DETERMINE
ADDRESS CHECK NOT REQUIRED
520

TRANSMIT
RESPONSE
ALLOWING VOWIFI
530

START TIMER
540

TIMER EXPIRES
550

SEND PUSH NOTIFICATION TO
MOBILE DEVICE
560

600

SEND REQUEST WITH
APPENDED INFO TO
ENTITLEMENT SYSTEM
610

RECEIVE RESPONSE BASED ON
APPLIED FILTER ALLOWING
VOWIFI CONNECTION
620

CONNECT TO VOWIFI FOR A TIME
PERIOD
630

RECEIVE PUSH NOTIFICATION
640

CONDUCT E911 ADDRESS
CHECK
650

ENHANCED 911 ADDRESS CHECK BYPASS

TECHNICAL BACKGROUND

Voice Over Wifi (VoWiFi), also known as WiFi calling, is a feature available in most of the smart phones such as iPhone®, Samsung Galaxy®, Google Pixel® etc. Wireless carriers also support WiFi calling on their internet protocol (IP) multimedia subsystems (IMS).

With VoWiFi, the mobile device user is able to utilize WiFi for voice calls instead of making voice calls directly over the cellular network. This feature is particularly useful when no mobile signal is available to the mobile users. For example, mobile users who reside in remote locations or mobile users traveling through remote locations may utilize VoWiFi. Further, in dense areas with tall buildings, mobile signals may be occasionally blocked and thus VoWiFi calling might be used. Additionally, VoWiFi calling can be used internationally by mobile users to avoid roaming charges.

With ordinary cellular calls, the mobile devices communicate with a base station or access node and the location of the mobile device can be ascertained through triangulation if the mobile device does not report its location. Access nodes may deploy different carriers within the cellular network utilizing different types of radio access technologies (RATs). RATs can include, for example, 3G RATs (e.g., GSM, CDMA etc.), 4G RATs (e.g., WiMax, LTE, etc.), and 5G RATs (new radio (NR)) and 6G RATs. Further, different types of access nodes may be implemented for deployment for the various RATs. For example, an evolved NodeB (eNodeB or eNB) may be utilized for 4G RATs and a next generation NodeB (gNodeB or gNB) may be utilized for 5G RAT However, with VoWiFi calling, the mobile device communicates over the Internet and does not communicate with the access node or base station directly. Thus, the location of the mobile device cannot always be readily ascertained by the wireless carrier. In order to allow VoWiFi calling on a mobile device, wireless carriers are required to maintain an enhanced 911 (E911) address corresponding to each wireless device. Because government agencies have an interest in accurate and timely dispatch of emergency personnel in the event of an emergency call, they must have a valid address matching the mobile device in order to dispatch emergency services personnel to the appropriate location. While in some instances, cell location data is available, some wireless devices may not provide this data.

In some cases, wireless carriers want the mobile subscriber to enable VoWiFi feature on the device even in the absence of a valid E911 address stored in the wireless carrier system. This may occur for example, when the wireless carrier wants to communicate with the wireless device subscriber in order to send push notifications. With current systems, without an E911 address already recorded, mobile subscriber interaction is necessary in order to allow this type of communication. The excessive subscriber interaction can be cumbersome.

Accordingly a solution is needed for enabling VoWiFi calling without any extra user interaction. The solution should enable push notifications from the wireless carrier to the mobile device.

OVERVIEW

Exemplary embodiments described herein include systems, methods, and processing nodes for emergency navigational pathing. An exemplary method includes receiving a request from a mobile device for enabling VoWiFi service and checking E911 address status. The method further includes applying a filter to the request to determine that the E911 address check can be bypassed. Additionally, the method includes transmitting a response to the mobile device indicating that E911 address status is not required and that VoWiFi connection is permitted, thereby bypassing the E911 address check. In further exemplary methods, a timer is started upon transmitting a response to the mobile device. Upon expiration of the timer, a push notification is transmitted to the mobile device to initiate an E911 address check.

Further exemplary embodiments include a system having a memory storing instructions and a processor accessing the memory and executing the instructions to perform multiple operations. The multiple operations include receiving a request from a mobile device for enabling voice over wi-fi (VoWiFi) service and checking E911 address status. The operations additionally include applying a filter to the request to determine that the E911 address check can be bypassed. The operations further include allowing the mobile device to connect to VoWiFi without an E911 address check.

In yet a further exemplary embodiment, a method includes sending a request from a mobile device for enabling voice over wi-fi (VoWiFi) service and checking E911 address status. The mobile device receives a determination in response to the request, based on an applied filter, that the E911 address check can be bypassed. The method further includes connecting to VoWiFi based on the determination.

DETAILED DESCRIPTION

Figure 1:
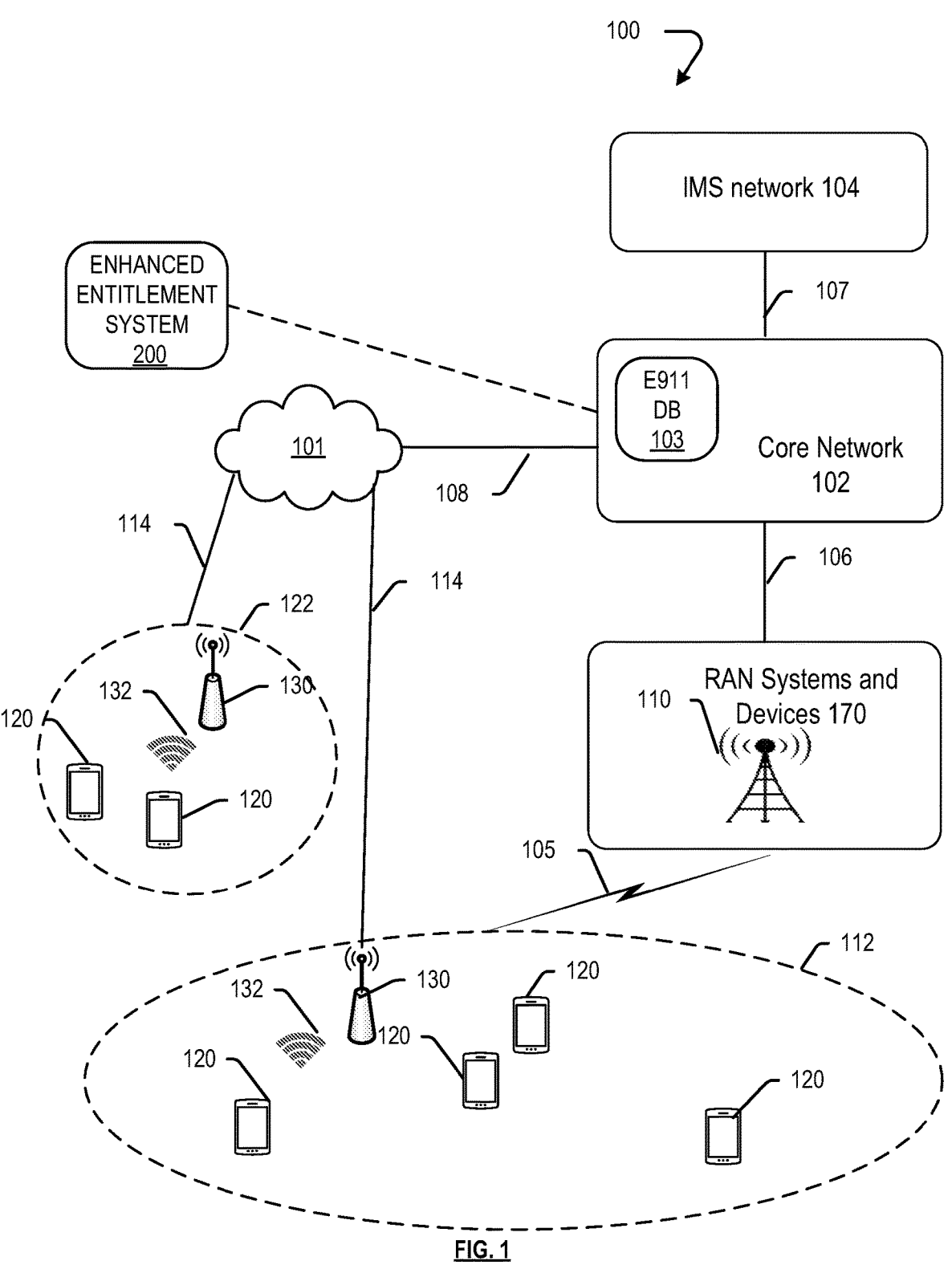
FIG. 1 depicts an exemplary operating environment for an enhanced entitlement system in accordance with the disclosed embodiments.

Exemplary embodiments described herein include systems and methods for bypassing an E911 address check, either temporarily or permanently, so that a wireless subscriber can connect to VoWiFi without excessive interaction. Currently, when a mobile subscriber attempts to access VoWiFi, the mobile subscriber transmits a message to an entitlement system requesting an address check in addition to the VoWiFi access request. The entitlement system checks a backend database including valid E911 addresses. When the backend database reveals that no valid E911 address is stored for the mobile subscriber, the entitlement system denies access to VoWiFi for the mobile subscriber.

The E911 address is used by emergency services to determine a mobile subscriber location. When VoWiFi calling is initially enabled, mobile subscribers are generally asked to register a physical address to ensure appropriate dispatch of emergency services in the event of a 911 call using WiFi. When a user attempts to call 911 while connected to WiFi, the mobile device will first attempt to use the cellular network as devices can be more accurately located using the cellular network. However, if wireless coverage is unavailable, the mobile device will try to complete a 911 call using the VoWiFi calling functionality.

In embodiments provided herein, the mobile device may provide information that can be passed through filters at an enhanced entitlement system in order to allow connection to VoWifi without the E911 address. For example, if the mobile device provides a GPS location, the GPS location may be transmitted to the enhanced entitlement system and the E911 address check can be temporarily or permanently disabled as the GPS location is known.

Further, other indicators, such as, for example, device source IP, device operating system, international mobile subscriber identity (IMSI) range, and international mobile equipment identity (IMEI) may be used as filters by the enhanced entitlement system. These filters may provide sufficient information for the enhanced entitlement system to locate or identify the mobile subscriber such that the E911 address check can be temporarily or permanently postponed.

Further, in embodiments disclosed herein, the wireless carrier aims to bypass the E911 address status check temporarily in order to allow the mobile subscriber to receive push notifications using VoWiFi. The address check functionality may be integrated with the enhanced entitlement system. When the E911 address check is temporarily bypassed, the enhanced entitlement system can trigger a secure push notification to initiate the E911 address check.

In embodiments described herein, the enhanced entitlement system may perform processing tasks in conjunction with stored data. For example, a database may store E911 addresses for mobile subscribers. The database may be stored, for example, at the core network or may be integral with the enhanced entitlement system. Alternatively, the database may be stored at another location in communication with the enhanced entitlement system and the core network. For example, the E911 database could be stored at the cellular base stations or other edge nodes. Through the use of systems, methods, and devices described herein, mobile subscribers will be able to access VoWiFi with minimal interaction regardless of E911 address status.

In addition to the systems and methods described herein, the operations for bypassing address check functionality may be implemented as computer-readable instructions or methods, and processing nodes on the network for executing the instructions or methods. The processing node may include a processor included in the access node or a processor included in any controller node in the wireless network that is coupled to the access node.

FIG. 1 depicts an exemplary environment 100 for an enhanced entitlement system 200 in accordance with the disclosed embodiments. The environment 100 may include a communication network 101, a core network 102, an IMS network 104 and a radio access network (RAN) 170, including at least one access node 110. The core network 102 is connected to the communication network 101 over communication link 108 and to the IMS network 104 over the communication link 106. The RAN 170 may include other devices and additional access nodes.

The environment 100 also includes multiple wireless devices 120 which may be end-user wireless devices such as smart phones and may operate within one or more coverage areas 112, 122. Further, one or more WiFi access points 130 may operate on the coverage areas 112 and 122 and allow the wireless devices 120 to connect via wireless link 132. The wireless devices 120 in the coverage area 112 communicate with the RAN 170 over communication link 105, which may for example be a 5G NR and/or 4G LTE communication link. However, the wireless devices 120 in the coverage area 122 may be out of range of the access node 110. Thus, the wireless devices 120 in the coverage area 122 may utilize WiFi 132 to connect to the wireless access point (WAP) or router 130. The WAP 130 may utilize communication link 114 to connect with a WLAN and the communication network 101, which may be the Internet.

The environment 100 may further include an enhanced entitlement system 200, which is illustrated as operating between the core network 102, the IMS network 104 and the communications network 101. However, it should be noted that the enhanced entitlement system 200 may be distributed. For example, the enhanced entitlement system may utilize components located at the core network 102, the communication network 101 and/or the IMS network 104. Alternatively, the enhanced entitlement system 200 may be an entirely discrete component, such as a processing node.

The enhanced entitlement system 200 receives information from mobile devices 120 attempting to connect to the router or WAP 130. Based on data received from the wireless devices 120. the enhanced entitlement system 200 performs processing steps to bypass an E911 address check in certain situations. The enhanced entitlement system 200 may apply filters to the information sent from the mobile devices 120 to determine if the E911 address check can be permanently or temporarily bypassed for the mobile device 120. To make this determination, the enhanced entitlement system 200 may access an E911 database 103. While the E911 database 103 is shown as being included in the core network, the E911 database 103 may be located in alternative location such as the IMS network 104 or as a discrete component. The E911 database 103 stores E911 addresses for mobile devices 120 subscribing to the wireless carrier.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 120. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

The core network 102 includes core network functions and elements. The core network 102 may have an evolved packet core (EPC) or may be structured using a service-based architecture (SBA). The network functions and elements may be separated into user plane functions and control plane functions. In an SBA architecture, service-based interfaces may be utilized between control-plane functions, while user-plane functions connect over point-to-point link. The user plane function (UPF) accesses a data network, such as network 101, and performs operations such as packet routing and forwarding, packet inspection, policy enforcement for the user plane, quality of service (QoS) handling, etc. The control plane functions may include, for example, a network slice selection function (NSSF), a network exposure function (NEF), a network repository function (NRF), a policy control function (PCF), a unified data management (UDM) function, an application function (AF), an access and mobility function (AMF), an authentication server function (AUSF), and a session management function (SMF). Additional or fewer control plane functions may also be included. The AMF receives connection and session related information from the wireless devices 120 and is responsible for handling connection and mobility management tasks. The SMF is primarily responsible for creating, updating, and removing sessions and managing session context. The UDM function provides services to other core functions, such as the AMF, SMF, and NEF. The UDM may function as a stateful message store, holding information in local memory. The NSSF can be used by the AMF to assist with the selection of network slice instances that will serve a particular device. Further, the NEF provides a mechanism for securely exposing services and features of the core network. The core network 102 may further include one or more databases 103 storing E911 addresses.

The IMS network 104 is a standards-based architectural framework for delivering multimedia communications services such as voice, video and text messaging for mobile devices over IP networks. The IMS network 104 can be decomposed into distinct application, control, and transport layers with standardized interfaces and may enable secure multimedia communications between diverse devices across diverse networks.

Communication links 106, 108, and 114 can use various communication media, such as air, space, metal, optical fiber, or some other signal propagation path, including combinations thereof. Communication links 106 and 108 can be wired or wireless and use various communication protocols such as Internet, Internet protocol (IP), local-area network (LAN), S1, optical networking, hybrid fiber coax (HFC), telephony, T1, or some other communication format-including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Other wireless protocols can also be used. Communication links 106 and 108 can be direct links or might include various equipment, intermediate components, systems, and networks, such as a cell site router, etc. Communication links 106 and 108 may comprise many different signals sharing the same link.

The RAN 170 may include various access network systems and devices such as access node 110. The RAN 170 is disposed between the core network 102 and the end-user wireless devices 120. Components of the RAN 170 may communicate directly with the core network 102 and others may communicate directly with the end user wireless devices 120 and WAPs 130. The RAN 170 may provide services from the core networks 102 to the end-user wireless devices 120.

The RAN 170 includes at least an access node (or base station) 110 such as an eNodeB of gNodeB 110 communicating with the plurality of end-user wireless devices 120 and wireless access points 130. It is understood that the disclosed technology may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB.

Access node 110 can be, for example, standard access nodes such as a macro-cell access node, a base transceiver station, a radio base station, an eNodeB device, an enhanced eNodeB device, a gNodeB in 5G New Radio ("5G NR"), or the like. The gNBs may include, for example, centralized units (CUs) and distributed units (DUs). Access node 110 can be configured to deploy one or more different carriers, utilizing one or more RATs. For example, a gNodeB may support NR and an eNodeB may provide LTE coverage. Any other combination of access nodes and carriers deployed therefrom may be evident to those having ordinary skill in the art in light of this disclosure.

The access nodes 110 can comprise a processor and associated circuitry to execute or direct the execution of computer-readable instructions to perform operations such as those further described herein. Access nodes 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof.

The wireless devices 120 may include any wireless device included in a wireless network. Wireless devices 120 may be any device, system, combination of devices, or other such communication platform capable of communicating wirelessly with access network 110 using one or more frequency bands and wireless carriers deployed therefrom and further capable of communicating with the network 101. Each of wireless devices 120, may be, for example, a mobile phone, a wireless phone, a wireless modem, a personal digital assistant (PDA), a voice over internet protocol (VOIP) phone, a voice over packet (VOP) phone, or a soft phone, an internet of things (IoT) device, as well as other types of devices or systems that can send and receive audio or data. The wireless devices 120 may be or include high power wireless devices or standard power wireless devices. Other types of communication platforms are possible.

Environment 100 may further include many components not specifically shown in FIG. 1 including processing nodes, controller nodes, routers, gateways, and physical and/or wireless data links for communicating signals among various network elements. Environment 100 may include one or more of a local area network, a wide area network, and an internetwork (including the Internet). Environment 100 may be capable of communicating signals and carrying data, for example, to support voice, push-to-talk, broadcast video, and data communications by end-user wireless devices 120. Environment 100 may include additional base stations, controller nodes, telephony switches, internet routers, network gateways, computer systems, communication links, or other type of communication equipment, and combinations thereof.

Other network elements may be present in the environment 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between the access networks 170 and the core network 102.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication environment 100 may be, comprise, or include computers systems and/or processing nodes, including access nodes, controller nodes, and gateway nodes described herein.

The operations for bypassing an E911 address check may be implemented as computer-readable instructions or methods, and processing nodes on the network for executing the instructions or methods. The processing node may include a processor included in the access node or a processor included in any controller node in the wireless network that is coupled to the access node.

Figure 2:
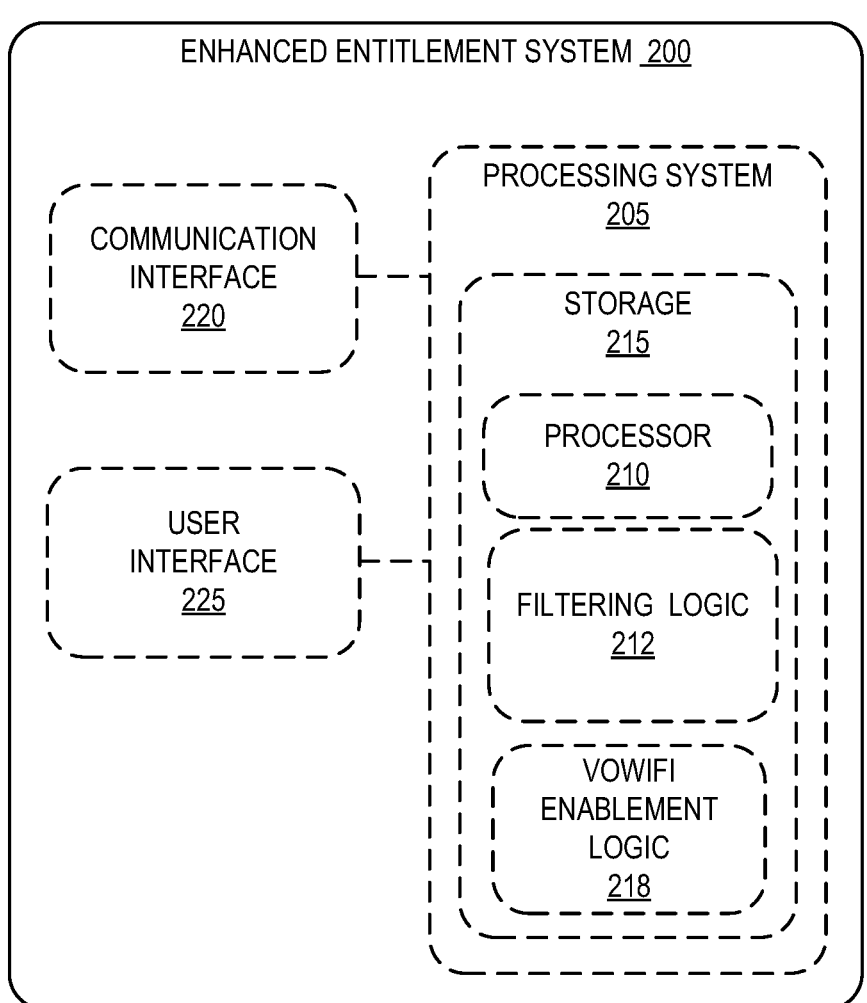
FIG. 2 illustrates an enhanced entitlement system having an address bypass function in accordance with disclosed embodiments.

FIG. 2 depicts further details of the enhanced entitlement system 200, which may be configured to perform the methods and operations disclosed herein to bypass the E911 address check. In the disclosed embodiments, the enhanced entitlement system 200 may be integrated with the core network 102, the IMS network 104, or may be an entirely separate component, such as a processing node, capable of communicating with the wireless devices 120 via WAPs or routers 130.

The enhanced entitlement system 200 may be configured to receive requests from wireless devices 120 to connect to VoWiFi. The requests from the wireless devices 120 may include information about the wireless device or mobile subscriber, such as, for example client source IP, client operating system, and/or client IMSI range. The enhanced entitlement system 200 may filter the received information to determine whether E911 address information is needed or whether the request for E911 address information can be postponed or omitted, or whether the E911 address information is required.

To provide appropriate address bypass determination, the enhanced entitlement system 200 includes a processing system 205. Processing system 205 may include a processor 210 and a storage device or memory 215. Storage device 215 may include a disk drive, a flash drive, a memory, or other storage device configured to store data and/or computer readable instructions or codes (e.g., software). The computer executable instructions or codes may be accessed and executed by processor 210 to perform various methods disclosed herein. Software stored in storage device 215 may include computer programs, firmware, or other form of machine-readable instructions, including an operating system, utilities, drivers, network interfaces, applications, or other type of software. For example, software stored in storage device 215 may include one or more modules for performing various operations described herein. For example, filtering logic 212 may be provided to include instructions to determine if the E911 address check can be bypassed. Further, VoWiFi enablement logic 218 may include instructions for enabling VoWiFi based on a bypassed address check or refusing to enable VoWiFi logic when the address check cannot be bypassed. Processor 210 may be a microprocessor and may include hardware circuitry and/or embedded codes configured to retrieve and execute software stored in storage device 215.

Communication interface 220 may include hardware components, such as network communication ports, circuitry, devices, routers, wires, antenna, transceivers, etc. These components may, for example, receive requests from the wireless devices 120 User interface 225 may be configured to allow a user to provide input to the enhanced entitlement system 200 and receive data or information from the enhanced entitlement system 200. User interface 225 may include hardware components, such as touch screens, buttons, displays, speakers, etc. The enhanced entitlement system 200 may further include other components such as a power management unit, a control interface unit, etc.

The enhanced entitlement system 200 thus may utilize the memory 215 and the processor 210 to perform multiple operations. For example, the processor 210 may access stored instructions in the memory 215 to determine whether the E911 address check can be bypassed. The location of the enhanced entitlement system 200 may depend upon the network architecture. For example, in smaller networks, a single enhanced entitlement system 200 may be disposed for communication with wireless devices 120. However, in a larger network, multiple enhanced entitlement systems 200 may be required to cover the network.

Figure 3A:
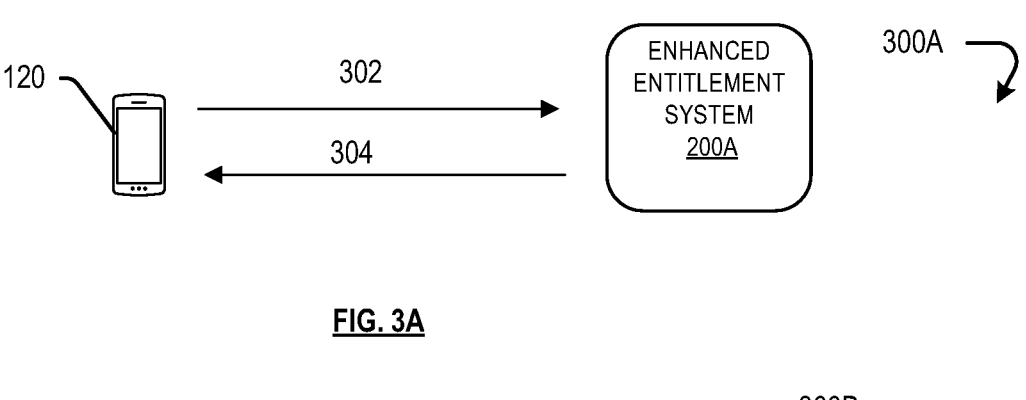
FIG. 3A illustrates an exemplary configuration for an address bypath method in accordance with disclosed embodiments.

FIG. 3A illustrates an exemplary configuration for an address bypath method in accordance with disclosed embodiments. As shown in FIG. 3A, the wireless device 120 sends a request 302 to an entitlement system 200A. The request 302 may request enablement of VoWiFi and further may include information such as GPS location, IMSI, IMEI, source address, and/or device operating system. Based on the request 302, the entitlement system 200A applies a filter to the received information. For example, the filter may specify that GPS location information or particular device operating systems, or particular IMEIs always provide accurate address information and therefore that the E911 address check can be avoided permanently for a particular device. Upon applying the filter, the enhanced entitlement system 200A may determine that the received information is sufficient to disable the E911 address check for the particular mobile subscriber and may send a response 304 to the wireless device 120 specifying that address status is not needed and enabling VoWiFi. The determination may further be stored, so that the wireless device 120 can permanently bypass the E911 address check. Of course in some situations, such as when the wireless device 120 provides no reliable location or identifying information, the address check cannot be bypassed and thus VoWiFi will not be enabled.

Figure 3B:
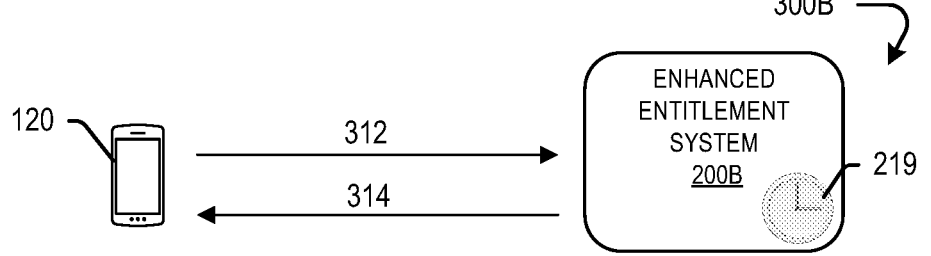
FIG. 3B illustrates a further exemplary configuration for an address bypass method in accordance with disclosed embodiments.

FIG. 3B illustrates a further exemplary configuration for an address bypass method in accordance with disclosed embodiments. More specifically, FIG. 3B illustrates a method for temporarily bypassing the E911 address check. As shown in FIG. 3B, the wireless device 120 sends a request 312 to an entitlement system 200B. The request 312 may request enablement of VoWiFi and further may include information such as GPS location, IMSI, IMEI, source address, and/or device operating system. Based on the request 302, the entitlement system 200B applies another filter to the received information. For example, the entitlement system 200B may determine if a source address is provided that reveals a current location of the wireless device 120. If the source address reveals the current location of the wireless device, then the enhanced entitlement system 200B may determine that the E911 address check can be temporarily bypassed because the current location of the device is known. Thus, in response to the request 312, the enhanced entitlement system 200B may set a timer 219 and grant temporary access to VoWiFi to the wireless device 120 at 314. The timer 219 may be incorporated in the VoWiFi enablement logic described above with reference to FIG. 2 or in another location within the enhanced entitlement system 200B. Upon expiration of the timer 219, the enhanced entitlement system 200B sends a push notification to the wireless device 120 requesting completion of the E911 address check.

Figure 3C:
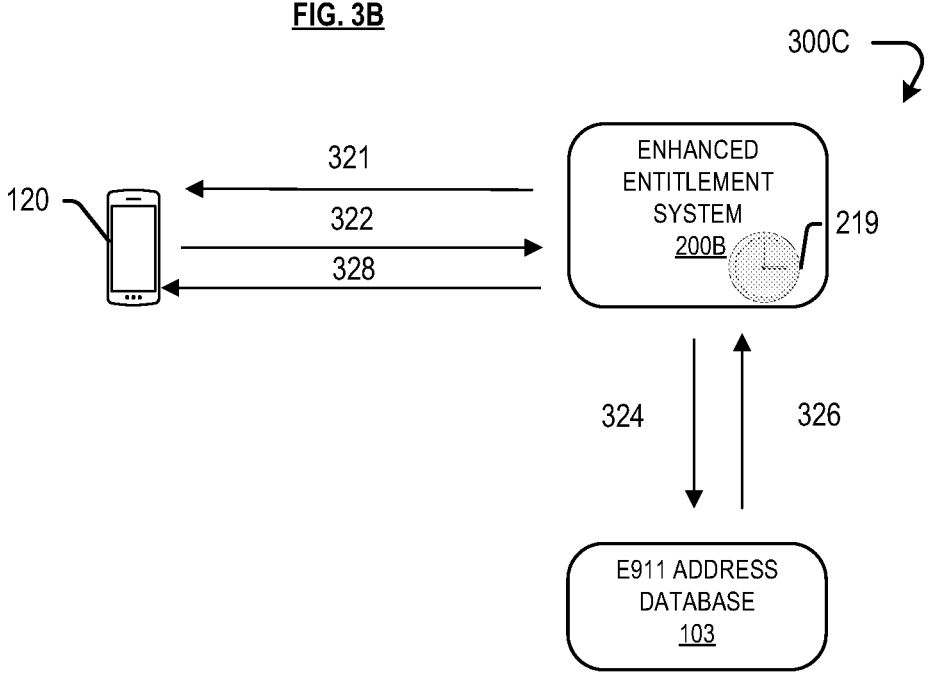
FIG. 3C illustrates a further method for processing after a temporary bypass in accordance with disclosed embodiments.

FIG. 3C illustrates completion of the E911 address check subsequent to the expiration of the timer 219. The wireless device 120 receives a secure push notification from the enhanced entitlement system 200B at 321. In response to the push notification, the wireless device 120 sends request to check the E911 address at 322. Subsequently, in step 324, the enhanced entitlement system 200B checks the address status at the E911 address database 103. If the address status is "present" in step 326, the enhanced entitlement system 200B determines that VoWiFi connection is allowed. However, if the address status is "not present" in step 326, the enhanced entitlement system 200B determines that the VoWiFi connection is not allowed. The enhanced entitlement system conveys the result at 328 to the wireless device 120.

Figure 4:
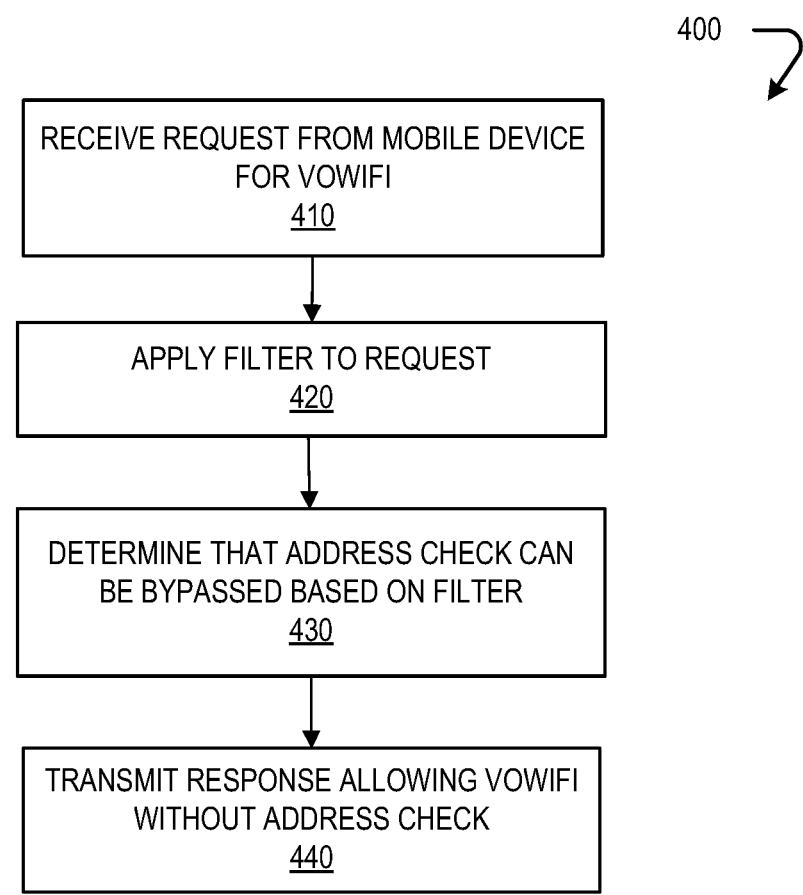
FIG. 4 depicts an exemplary method for bypassing an address check in accordance with disclosed embodiments.
Figure 5:
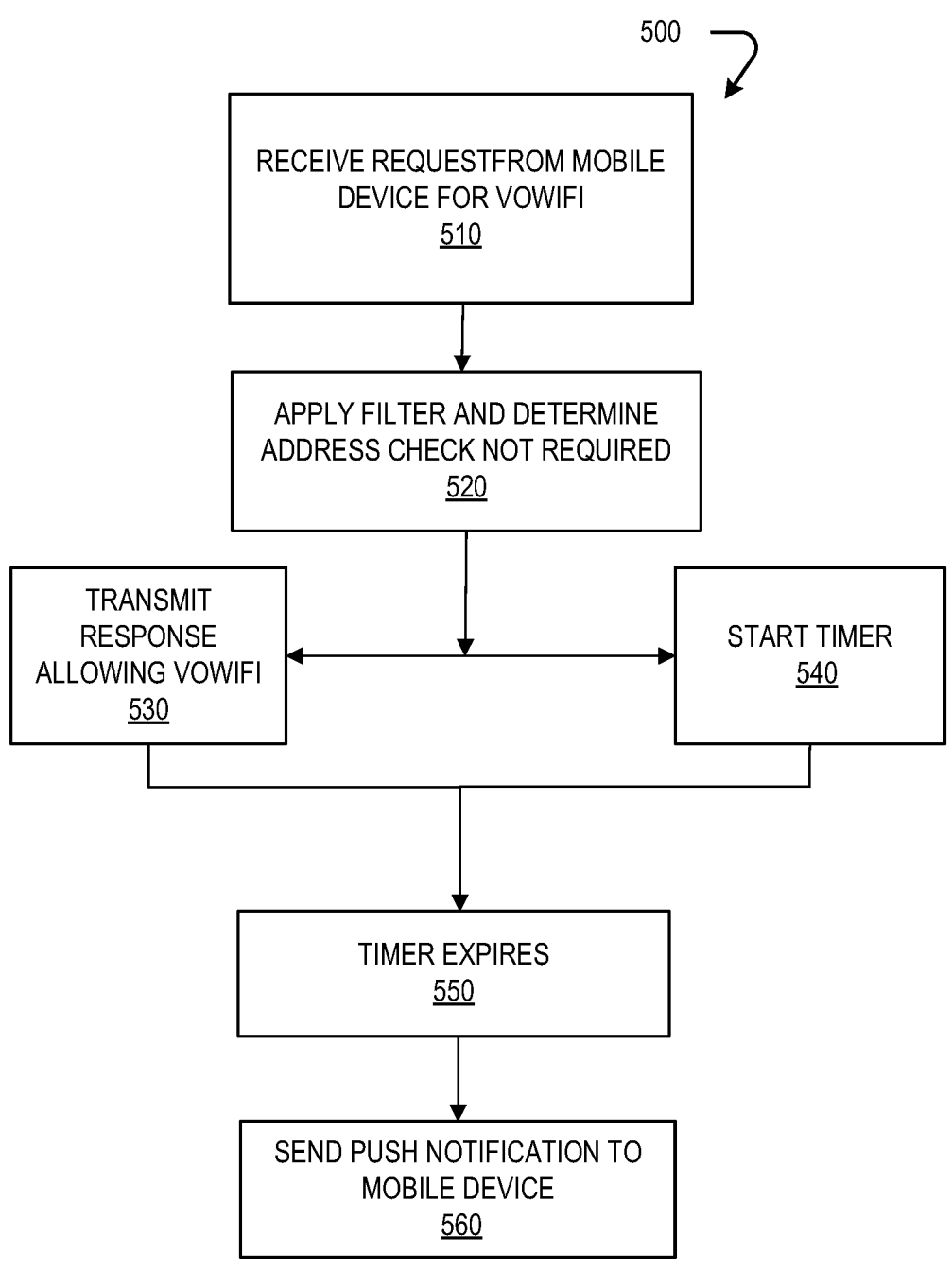
FIG. 5 depicts a further exemplary method for bypassing an address check in accordance with disclosed embodiments.

The disclosed methods for bypassing the E911 address check are discussed further below. FIG. 4 illustrates an exemplary method 400 for bypassing the E911 address check. Method 400 may be performed by any suitable processor discussed herein, for example, the processor 210 included in the enhanced entitlement system 200. For discussion purposes, as an example, method 400 is described as being performed by the processor 210 of the enhanced entitlement system 200.

Method 400 begins in step 410, when the enhanced entitlement system 200 receives a request from a mobile device 120 for VoWiFi. As set forth above, the request may include information such as GPS location, IMSI, IMEI, source IP address, and/or device operating system. Specifically, the request includes further information about the wireless device 120, about the mobile subscriber utilizing the wireless device 120, or further information about the location of the wireless device 120.

Upon receiving the request, the enhanced entitlement system 200 applies a filter to the request in step 420. Specifically, the enhanced entitlement system 200 applies a filter to received information to determine if the received information is sufficient to bypass the E911 address check. For example, the filter may specify that GPS location information or particular device operating systems, or particular IMEIs always provide accurate address information. Based upon application of the filter in step 420, the enhanced entitlement system 200 may determine that the address check can be bypassed for the wireless device 120.

For example, if the information indicates that the wireless device 120 always provides address information, then the enhanced entitlement system 200 may determine that the E911 address check can be avoided permanently for a particular device. For example, the filtering step may include applying an IMEI filter and permanently disabling the E911 address check based on the IMEI filter. In some situations, where the filtering step 420 is unsuccessful, the wireless device 120 will be required to complete the E911 address check as further explained below.

Finally, in step 440, upon successful application of the filter in step 430, when the enhanced entitlement system 200 determines that the E911 address check can be bypassed, the enhanced entitlement system 200 allows VoWifi connection for the wireless device 120. Specifically, the enhanced entitlement system 200 transmits a response to the wireless device 120 allowing VoWiFi connection without the E911 address check. The determination may further be stored, so that the wireless device 120 can permanently bypass the E911 address check. Of course in some situations, such as when the wireless device 120 provides no reliable location information or other identifying information, the address check cannot be bypassed and thus VoWiFi will not be enabled.

Method 500 begins in step 510, when the enhanced entitlement system 200 receives a request from the mobile device 120 for VoWiFi. As set forth above, the request may include information such as GPS location, IMSI, IMEI, source IP address, and/or device operating system. Specifically, the request includes further information about the wireless device 120, further information about the location of the wireless device 120, or further information about the mobile subscriber.

Upon receiving the request, the enhanced entitlement system 200 applies a filter to the request in step 520. Specifically, the enhanced entitlement system 200 applies a filter to received information to determine if the received information is sufficient to bypass the E911 address check. The filtering may check for additional information about the wireless device 120, about the location of the wireless device 120, or about the mobile subscriber. For example, the entitlement system 200 may determine if a source IP address is provided that reveals a current location of the wireless device 120. If the source IP address reveals the current location of the wireless device, then the enhanced entitlement system 200 may determine that the E911 address check can be temporarily bypassed because the current location of the device is known.

Upon making this determination in step 520 that the E911 address check can temporarily be bypassed, the enhanced entitlement system 200 starts the timer 219 in step 540 and transmits a response to the wireless device 120 allowing temporary connection to VoWiFi. The timer 219 may be set to ten minutes or an hour or any other configurable timeframe. Further, preferably simultaneously with the setting of the timer 219, the enhanced entitlement system 200 transmits a response to the wireless device 120 in step 530 temporarily allowing VoWiFi.

After transmission of the response and connection to VoWiFi in step 530, the timer expires in step 550. Upon expiration of the timer in step 550, the enhanced entitlement system 200 sends a push notification to the wireless device 120 in step 560 instructing the wireless device to proceed with the E911 address check and the temporary connection to VoWiFi will be terminated. The E911 address check proceeds in accordance with FIG. 3C and its accompanying description. Specifically, the enhanced entitlement system 200 receives a further request to check the E911 address status in response to the push notification. The enhanced entitlement system 200 determines that the further request is in response to an expired bypass and proceeding with the E911 address check. Thus, when the E911 address check is successful, the enhanced entitlement system 200 allows VoWiFi for the mobile device 120 after the expired bypass. However, if the E911 address check following the expired bypass is unsuccessful, the enhanced entitlement system 200 disallows VoWiFi for the mobile device 120.

Figure 6:
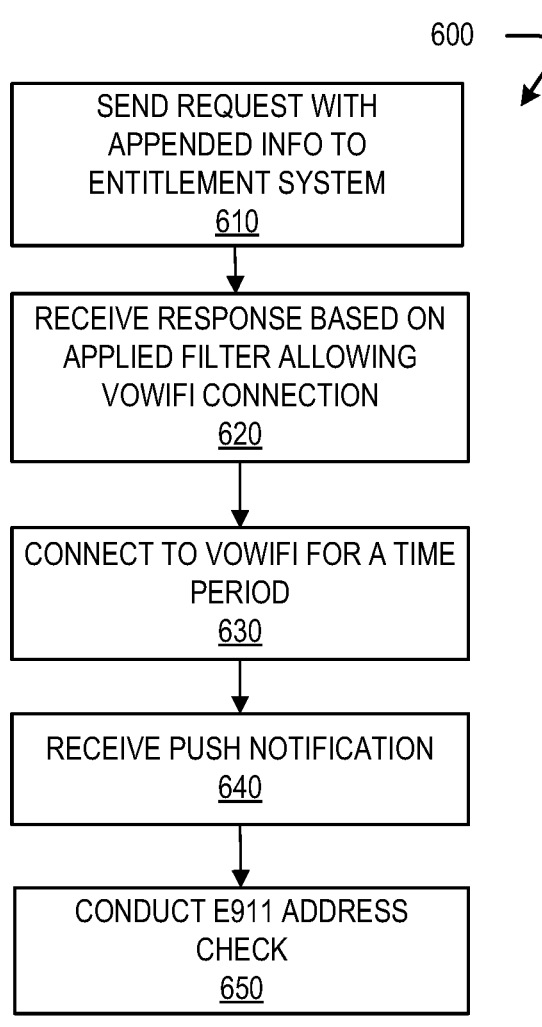
FIG. 6 depicts a further exemplary method performed by a wireless device when bypassing an address check in accordance with disclosed embodiments.

FIG. 6 illustrates a further exemplary method 600 for emergency navigational pathing. Method 600 may be performed by the wireless device 120. For discussion purposes, as an example, method 600 is described as being performed by the wireless device 120.

The method begins in step 610, when the wireless device 120 sends a request with appended information to the enhanced entitlement system 200. As set forth above, the request may include information such as GPS location, IMSI, IMEI, source IP address, and/or device operating system. Specifically, the request includes further information about the wireless device 120, further information about the location of the wireless device 120, and/or further information about the mobile subscriber.

In step 620, the wireless device 120 receives a response from the enhanced entitlement system 200 based on an applied filter. In embodiments provided herein, the response allows the wireless device 120 to connect to VoWiFi temporarily. Accordingly, in step 630, the wireless device 120 connects to VoWiFi for a set time period. In embodiments set forth herein, the set time period corresponds to the setting of the timer 219 at the enhanced entitlement system 200. In step 640, upon expiration of the time period, the wireless device 120 receives a push notification from the enhanced entitlement system 200 requesting an E911 address check. In step 650, the wireless device 120 conducts steps with the enhanced entitlement system 200 to complete the E911 address check.

In some embodiments, methods 400, 500, and 600 may include additional steps or operations. Furthermore, the methods may include steps shown in each of the other methods. As one of ordinary skill in the art would understand, the methods 400, 500, 600 may be integrated in any useful manner and the steps may be performed in any useful sequence.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices. Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not all be within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:

receiving a request from a mobile device for enabling voice over wi-fi (VoWiFi) service and checking E911 address status;

applying a filter to the request to determine that the E911 address check can be bypassed; and transmitting a response to the mobile device indicating that E911 address status is not required and that VoWiFi connection is permitted, thereby bypassing the E911 address check.

2. The method of claim 1, further comprising starting a timer upon transmitting the response to the mobile device.

3. The method of claim 2, further comprising triggering a secured push notification to the mobile device upon expiration of the timer.

4. The method of claim 3, further comprising receiving a further request to check the E911 address status in response to the push notification.

5. The method of claim 4, further comprising determining that the further request is in response to an expired bypass and proceeding with the E911 address check.

6. The method of claim 5, further comprising allowing VoWiFi for the mobile device after the expired bypass when the E911 address check is successful.

7. The method of claim 5, further comprising disallowing VoWiFi for the mobile device when the E911 address check is unsuccessful.

8. The method of claim 1, wherein the filter comprises additional information about the mobile device.

9. The method of claim 1, wherein the filter comprises at least one of a source internet protocol (IP) address, a client operating system, an international mobile subscriber identity (IMSI) range or an international mobile equipment identity (IMEI).

10. The method of claim 9, further comprising applying the IMEI filter and permanently disabling the E911 address check based on the IMEI filter.

11. A system comprising:

a memory storing instructions; and a processor accessing the memory and executing the instructions to perform operations including:

receiving a request from a mobile device for enabling voice over wi-fi (VoWiFi) service and checking E911 address status;

applying a filter to the request to determine that the E911 address check can be bypassed; and allowing the mobile device to connect to VoWiFi without an E911 address check.

12. The system of claim 11, the system further comprising communications circuitry transmitting a response to the mobile device indicating that VoWiFi is allowed and the E911 address check is not required.

13. The system of claim 12, the operations further comprising starting a timer upon transmitting the response to the mobile device.

14. The system of claim 13, the operations further comprising triggering a secured push notification to the mobile device upon expiration of the timer.

15. The system of claim 14, the operations further comprising receiving a further request to check the E911 address status in response to the push notification.

16. The system of claim 15, the operations further comprising determining that the further request is in response to an expired bypass and proceeding with the E911 address check.

17. The system of claim 11, wherein the filter comprises additional information about the mobile device.

18. A method comprising:

sending a request from a mobile device for enabling voice over wi-fi (VoWiFi) service and checking E911 address status;

receiving a determination in response to the request, based on an applied filter, that the E911 address check can be bypassed; and connecting to VoWiFi based on the determination.

19. The method of claim 18, wherein sending the request comprises sending at least one of a source IP address, a client operating system, a client IMSI range or an IMEI for use as the applied filter.

20. The method of claim 19, further comprising receiving a secured push notification upon expiration of a timer sending another request for an E911 address check in response to the secured push notification.

\* \* \* \* \*